United States Patent [19]

Adachi

[11] Patent Number: 4,813,523
[45] Date of Patent: Mar. 21, 1989

[54] CLUTCH DISC

[75] Inventor: Naomichi Adachi, Chiryu, Japan

[73] Assignee: Aisin Seiki Kabushiki Kaisha, Kariya, Japan

[21] Appl. No.: 6,929

[22] Filed: Jan. 27, 1987

[30] Foreign Application Priority Data

Feb. 6, 1986 [JP] Japan .............. 61-15158[U]

[51] Int. Cl.$^4$ .................. F16D 3/66; F16D 13/38
[52] U.S. Cl. ..................... 192/106.2; 464/68
[58] Field of Search ............ 192/106.2, 106.1; 464/68

[56] References Cited

U.S. PATENT DOCUMENTS

| | | | |
|---|---|---|---|
| 1,963,187 | 6/1934 | Wood | 192/106.2 |
| 2,826,902 | 3/1958 | De Coursey | 192/106.2 X |
| 3,534,841 | 10/1970 | Schneider et al. | 192/106.2 |
| 4,433,771 | 2/1984 | Caray | 192/106.2 |
| 4,577,742 | 3/1986 | Saida | 192/106.2 |
| 4,679,679 | 7/1987 | Lech et al. | 192/106.2 |

Primary Examiner—Rodney H. Bonck
Attorney, Agent, or Firm—Burns, Doane, Swecker & Mathis

[57] ABSTRACT

A clutch disc includes a hub connected to a torque output shaft, an inner hub flange formed as an integral part of the hub, an outer hub flange arranged in concentric fashion on the outer side of the inner hub flange so as to rotate freely via a spline through a prescribed angle with respect to the inner hub flange, main and auxiliary disc plates arranged on both sides of the two flanges in the axial direction thereof and connected to the torque input shaft, and sliding friction arrangement provided between the flanges and the disc plates. A cylindrical portion is provided on a portion of the outer hub flange, and annular friction members are fitted between an inner circumferential surface of the cylindrical portion and an outer circumferential portion of the hub.

13 Claims, 3 Drawing Sheets

CLUTCH DISC

BACKGROUND OF THE INVENTION

This invention relates to a clutch disc and, more particularly, to a split hub-type clutch disc.

A clutch disc of the type in which the hub flange is split into inner and outer flanges is well-known in the art. Such a clutch disc comprises a hub connected to a torque output shaft, an inner hub flange formed as an integral part of the hub, an outer hub flange arranged in concentric fashion on the outer side of the inner hub flange so as to rotate freely via a spline through a prescribed angle with respect to the inner hub flange, main and auxiliary disc plates arranged on both sides of the two flanges in the axial direction thereof and connected to the torque input shaft, and sliding friction means provided between the flanges and the disc plates. Generally, in order to obtain stable hysteresis at the portion where the inner and outer hub flanges are splined in a clutch disc of this type, a plate which covers the splined portion and co-rotates with the inner hub flange is arranged in hysteresis means, namely the sliding friction means.

In the aforementioned arrangement, the outer hub flange is loosely fitted with respect to the inner hub flange and therefore moves in the diametric direction. Consequently, the spline teeth of the outer hub flange move diametrically and the inner and outer peripheries of both sets of teeth contact and slide against each other under friction. The result is an ill-timed, uncontrolled torque. The hysteresis in the torque transfer characteristic of the clutch disc therefore becomes unstable and excessive hysteresis is produced. This is a problem especially during idling, which demands little hysteresis. An example of the prior art directed to preventing the abovementioned diametric movement of the outer hub flange is French Patent No. FP2270491. In the art disclosed, diametric immobilizing means are provided on a torsion seat face and on the spline tooth face of the hub flange engaging the seat face. Though this arrangement prevents the torsion seat from contacting a notched portion of the flange, it cannot prevent the spline teeth of both flanges from contacting each other in the diametric direction.

SUMMARY OF THE DISCLOSURE

Accordingly, an object of the present invention is to provide a clutch disc in which the spline teeth of both flanges are prevented from coming into diametric contact, thereby avoiding unstable, excessive hysteresis.

According to the invention, the foregoing object is attained by providing a cylindrical portion on a portion of the outer hub flange and fitting annular friction members between the inner circumferential surface of the cylindrical portion and the outer circumferential surface of the hub.

DESCRIPTION OF THE PREFERRED EMBODIMENT

In a preferred embodiment of the invention, the cylindrical portion comprises first and second cylindrical portions provided respectively on first and second side surfaces of the outer hub flange in a region at the outer periphery of a splined portion and extending axially between the outer hub flange and the main disc plate and between the outer hub flange and the auxiliary disc plate, respectively.

The annular friction members are arranged on both sides of the inner and outer hub housings in the axial direction and are fitted between the outer circumferential surface of the hub and the inner circumferential surfaces of the first and second cylindrical portions, respectively.

The annular friction members are arranged on both sides of the inner and outer hub flanges and form a sliding friction surface with an annular plate member which covers the splined portion of the inner and outer hub flanges and rotates together with the inner hub flange.

The annular friction members consist of a material having a low coefficient of friction.

Low rigidity and little hysteresis are required in order to prevent transmission gear noises during idling. Hysteresis during idling is obtained by friction members constituting friction sliding means (hysteresis means) 60. The annular friction members used in the invention perform a dual function: they serve as friction members and also as support bodies which prevent the outer hub flange from moving diametrically.

The friction torque resulting from these annular friction members during idling is produced at contact surfaces indicated by numerals 15, 16 in FIG. 2 and at a contact surface indicated by numeral 17 in FIG. 1. The friction torque at these locations can be made small in magnitude by using friction members having a low coefficient of friction. As a result, the small hysteresis required at idling can be obtained. Further, the friction torque at contact surfaces 18, 19 in FIG. 2 is produced during acceleration to start the vehicle moving forward and when the vehicle is traveling. Accordingly, the friction torque produced at the contact surfaces present no problems during the aforementioned acceleration and travel of the vehicle.

The annular friction members of the invention support the outer hub flange on the outer circumference of the hub together with the cylindrical portion provided on the portion of the outer hub flange. As a result, the outer hub flange in the loosely fitted state of the prior-art arrangement is free of play and backlash and there is no diametric contact between the teeth of both splines. Thus the invention eliminates excessive torque produced by contact between the teeth, as well as unstable hysteresis caused by sporatic contact between the teeth. These phenomena are detrimental during engine idling, which requires small, stable hysteresis. As mentioned above, the arrangement of the invention is such that the annular friction members are made to function as friction members and as supporting bodies. The result is small, stable hysteresis within the space of a clutch disc through a simple construction.

The annular friction members of the invention function as both friction members and support bodies. When performing the function of a support body consisting of a material having a low coefficient of friction, these members prevent movement in the diametric direction. The result is a small degree of stable hysteresis.

EXAMPLE

Figure 1:
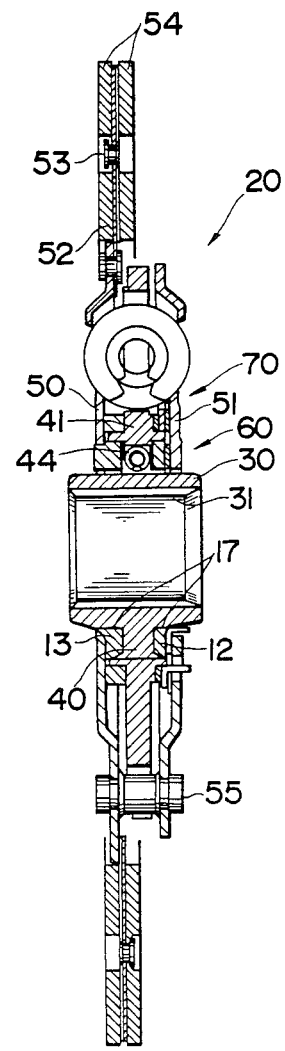
FIG. 1 is a sectional view taken along line I—I of FIG. 3 illustrating a clutch disc according to the present invention.
Figure 3:
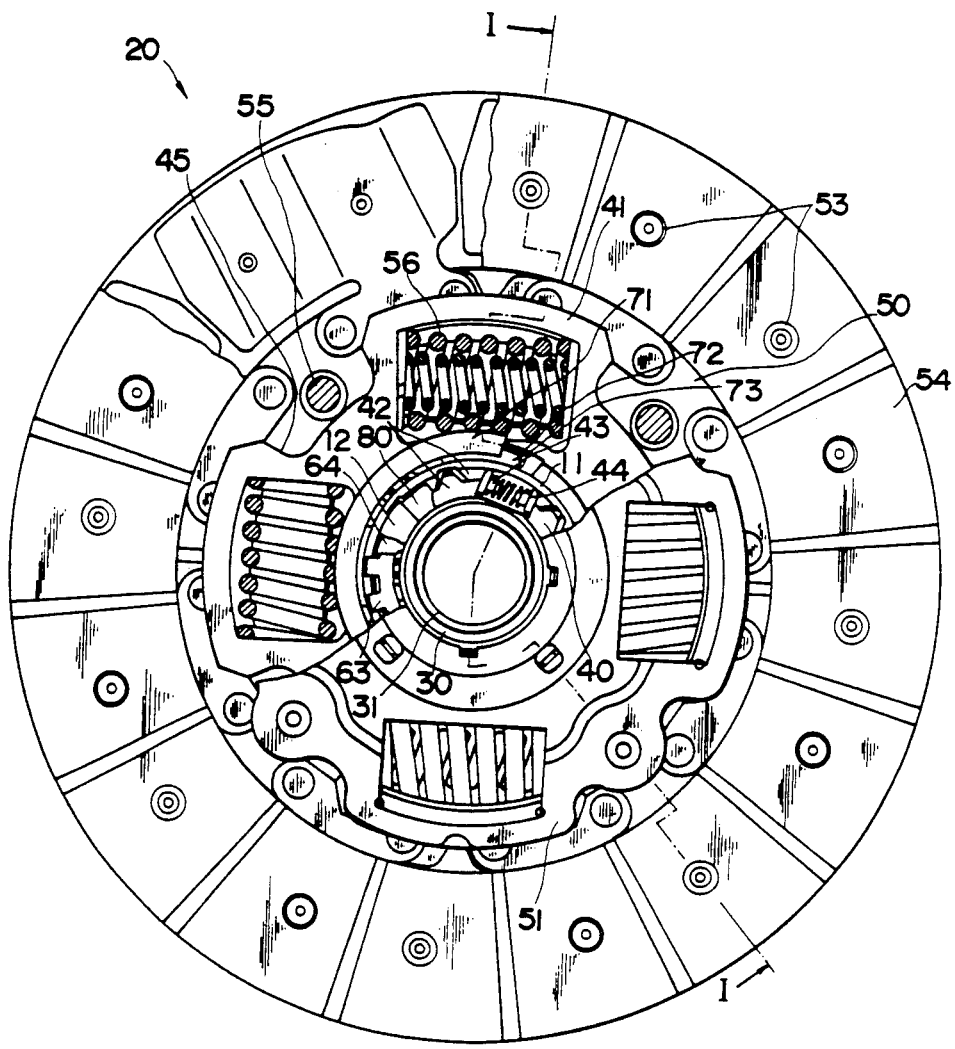
FIG. 3 is a side view, partially cut away, showing the clutch disc of the present invention.

A clutch disc in accordance with the present invention will now be described with reference to the accompanying drawings. As shown in FIGS. 1 and 3, the clutch disc, designated at numeral 20, comprises a hub 30 connected to an output shaft (not shown), an inner hub flange 40 and an outer hub flange 41 arranged in concentric relation with respect to the hub 30, a main disc plate 50 provided on one side of the two hub flanges 40, 41 and an auxiliary disc plate 51 arranged on the other side of these two hub flanges, the plates 50, 51 being concentric with and free to rotate relative to the hub, and hysteresis means provided between the hub flange 40 and main plate 50 and between the hub flange 41 and auxiliary plate 51.

As shown in FIG. 1, a spline 31 is provided on the inner side of the hub 30 and has a torque output shaft (not shown) joined thereto. The inner hub flange 40 is provided on the outer circumferential surface of the hub 30 as an integral part thereof, and the outer hub flange 41 is provided on the outer side of the inner hub flange 40 in concentric relation with respect thereto. As shown in FIG. 3, spline teeth 42 are provided on the opposing faces of the inner hub flange 40 and outer hub flange 41 so that the hub flanges 40, 41 are capable of rotating relative to each other through a prescribed angle. Notches 43 are formed between the inner hub flange 40 and outer hub flange 41, and a torsion spring 44 is received in each notch 43. When the inner hub flange 40 and the outer hub flange 41 rotate relative to each other, a torque is transmitted from the outer hub flange 41 to the hub 30 in accordance with the inner hub flange 40 via the spring 44 in the cut-out 43.

A facing plate 52 is secured on the outer circumferential portion of the main disc plate 50, and friction pads 54 are secured to both sides of the plate 52 by rivets 53. The main disc plate 50 and auxiliary disc plate 51 are integrated by a pin 55 to clamp the hysteresis means 60 between these plates and the hub flanges 40, 41. The main and auxiliary plates 50, 51 integrated in this manner are capable of rotating with respect to the hub 30 while the pin 55 moves in a notch 45 provided in the outer circumference of the hub flange 41. During this rotation of the plates 50, 51, torque is successively transmitted by torsion springs 56 provided between the outer hub flange 41 and the plates 50, 51.

Figure 2:
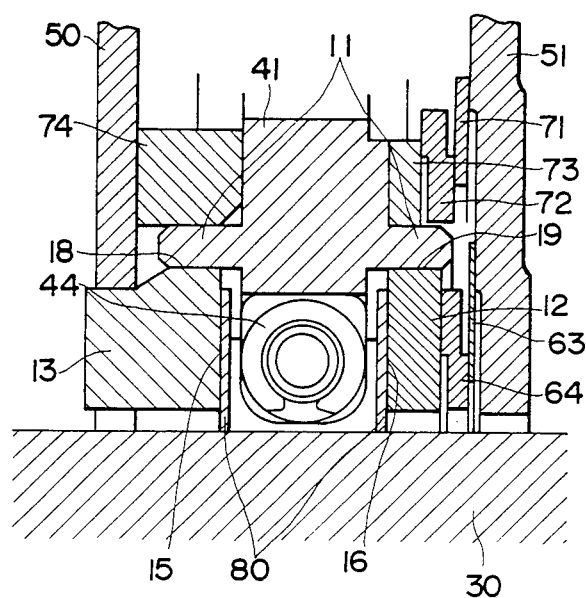
FIG. 2 is a partial enlarged view illustrating the outer circumferential portion of a hub.

Let us now refer to FIG. 2 to describe the hysteresis means 60 provided between the main and auxiliary plates 50, 51 and the hub flanges 40, 41. The hysteresis means 60 comprises a friction member 13 and a plate member 80 disposed in a space defined by the main disc plate 50 and hub flanges 40, 41, the plate member 80 being located inwardly of the main disc plate 50, and a dish spring 63, thrust plate 64, friction member 12 and plate member 80 disposed in a space defined by the auxiliary plate 51 and hub flanges 40, 41, these latter elements being arranged successively inwardly in the order mentioned. The hysteresis means 60 decides a first stage of hysteresis of a torque transfer characteristic curve. Hysteresis means 70 for deciding stages of hysteresis from the second stage onward is provided on the outer circumferential portion. The hysteresis means 70 comprises a dish spring 71, thrust plate 72 and friction members 73, 74. The hysteresis means 70 has no relation to the present invention and therefore need not be described.

As shown in FIGS. 2 and 3, the various elements forming the hysteresis means 60 have a diameter tht substantially covers the torsion spring notch 43 between the inner hub flange 40 and outer hub flange 41, as well as the spline portion 42. The plate member 80 prevents the friction members 12, 13 from directly contacting the side faces of the spline teeth of the inner and outer hub flanges, and the friction members 12, 13 slide in frictional contact with the plate member 80, thereby providing stable hysteresis. The plate member rotates in unison with the inner hub flange 40. The friction member 12 is disposed between the plate member 80 and the thrust plate 64, and the friction member 13 is fitted as a centering bush into a hole formed in the main disc plate 50. The friction members 12, 13, which are annular in shape, are in surface contact, as shown at 18, 19, with the inner circumferential surface of a cylindrical portion 11 provided on the side face of the spline portion of the outer hub flange 41, and in surface contact with the outer circumferential surface of hub 30, as shown at 17. The cylindrical portion 11 should be large enough in the axial direction to support the outer hub flange 41 on the friction members 12, 13 inboard of the main and auxiliary plates 50, 51. The friction members 12, 13 consist of a material having a relatively low coefficient of friction.

The arrangement of the clutch disc 20 is such that torque from the input side is transferred to the friction members 13 and 12 via the main and auxiliary plates 50, 51, respectively. Since the plate member 80 is fixed circumferentially with respect to the hub 30, friction is always produced between the friction members 12, 13 and the plate member 80 so that stable hysteresis is obtained. The degree of hysteresis is small because the friction members consist of a material having relatively a low coefficient of friction. Torque from the input side is transferred to the outer hub flange 41 via the main and auxiliary plates 50, 51 and the torsion spring 56, at which time diametric movement of the outer hub flange 41 is prevented by the annular friction members 12, 13. As a result, diametric contact between the spline teeth 42 of the outer hub flange 41 and inner hub flange 40 is eliminated and excessive hysteresis is prevented. Thus, hysteresis having greater stability is obtained.

As many apparently widely different embodiments of the present invention can be made without departing from the spirit and scope thereof, it is to be understood that the invention is not limited to the specific embodiments thereof except as defined in the appended claims.

What I claim is:

1. In a clutch disc having a cylindrical hub connected to a torque output shaft, an inner hub flange formed as an integral part of the hub, an outer hub flange arranged coaxially around the outer circumference of the inner hub flange so as to rotate through a prescribed angle relative to the inner hub flange, both inner and outer hub flanges being connected by a spline coupling formed therebetween, main and auxiliary disc plates arranged to sandwich the inner and outer hub flanges in the axial direction thereof and connected to a torque input shaft, and sliding friction means provided so as to allow friction between the inner and outer hub flanges, an improvement wherein the outer hub flange has a cylindrical portion extending from each side surface of the outer hub flange around and coaxially with the hub, a frictional inner surface of the cylindrical portion and a frictional outer cylindrical surface of the hub defining an annular space therebetween, and wherein an annular friction member is seated in said annular space so that an inner peripheral surface of the friction member is in sliding contact with the outer frictional cylindrical surface of said hub and an outer peripheral surface of the friction member is in sliding contact with the frictional inner surface of the cylindrical portion, the friction member having a radial width to secure radial clearances in the spline coupling.

2. The improvement according to claim 1, wherein said cylindrical portion comprises first and second cylindrical portions provided respectively on first and second side surfaces of said outer hub flange in a region at the outer periphery of the spline coupling and extending axially between said outer hub flange and said main disc plate and between said outer hub flange and said auxiliary disc plate, respectively.

3. The improvement according to claim 2, wherein annular friction members are arranged on both sides of the inner and outer hub flanges in the axial direction and are fitted between the frictional outer cylindrical surfaces of said hub and the frictional inner cylindrical surfaces of said first and second cylindrical portions respectively.

4. The improvement according to claim 3, wherein said annular friction members form a sliding friction surface with an annular plate member which covers the spline coupling between said inner and outer hub flanges and rotates together with said inner hub flange.

5. The improvement according to claim 1, wherein said annular friction members consist of a material having a relatively low coefficient of friction.

6. In a clutch disc having a cylindrical hub connected to a torque output shaft, an inner hub flange formed as an integral part of the hub, an outer hub flange arranged coaxially around the outer circumference of the inner hub flange so as to rotate through a prescribed angle relative to the inner hub flange, both the inner and outer hub flanges being connected by a spline coupling formed therebetween, an assembly of main and auxiliary disc plates arranged to sandwich the inner and outer hub flanges in the axial direction thereof and connected to a torque input shaft, and sliding friction means provided so as to allow friction between the inner and outer hub flanges and also between the inner hub flange, the outer hub flange and the assembly of the main and auxilliary disc plates, wherein the improvement comprising the outer hub flange having two cylindrical portions extending from opposite side surfaces of the outer hub flange around and coaxially with the hub, at least one of the cylindrical portions having a cylindrical inner surface and a cylindrical outer surface, one of the cylindrical portions being positioned between the outer hub flange and the main disc plate, and the other cylindrical portion being positioned between the outer hub flange and the auxiliary disc plate, the inner surface of at least one of the cylindrical portions and an associated outer cylindrical surface of the hub defining an annular space therebetween, and wherein the sliding friction means comprises an annular inner friction member seated in said annular space so that an inner peripheral surface of the inner friction member is in contact with the outer cylindrical surface of said hub and so that an outer peripheral surface of the inner friction member is in sliding contact with the inner surface of the cylindrical portion, the inner friction member having a radial with to secure radial clearances in the spline coupling.

7. The improvement according to claim 6, wherein annular inner friction members are arranged on both sides of said inner and outer hub flanges in the axial direction and are fitted between the outer cylindrical surface of said hub and the inner cylindrical surfaces of said first and second cylindrical portions, respectively.

8. The improvement according to claim 7, wherein said annular inner friction members form a sliding friction surface with an annular plate member which covers the spline coupling between said inner and outer hub flanges and rotates together with said inner hub flange.

9. The improvement according to claim 6, wherein said annular inner friction members consist of a material having a relatively low coefficient of friction.

10. The improvement according to claim 6, wherein the sliding friction means comprises at least two annular outer friction members allowing friction between the outer hub flange and the assembly of main and auxiliary disc plates, at least one of the outer friction members having an inner-diameter side surface in sliding contact with the outer surface of one of the cylindrical portions, one of the outer friction members being seated in a space bounded by one of the outer hub flange side surfaces, the outer surface of one of the cylindrical portions and the main disc plate, the other of the outer friction members being seated in a space bounded by the opposite outer hub flange side surface, the outer surface of the other cylindrical portion and the auxiliary disc plate.

11. The improvement according to claim 10, wherein friction coefficients of the outer friction members are greater than those of the inner friction members.

12. In a clutch disc having a cylindrical hub connected to a torque output shaft, an inner hub flange formed as an integral part of the hub, an outer hub flange arranged coaxially around the outer circumference of the inner hub flange so as to rotate through a prescribed angle relative to the inner hub flange, both the inner and outer hub flanges being connected by a spline coupling formed therebetween, main and auxiliary disc plates arranged to sandwich the inner and outer hub flanges in the axial direction thereof and connected to a torque input shaft, and sliding friction means provided so as to allow friction between the inner and outer hub flanges, wherein the improvement comprises:
  the outer hub flange having cylindrical portions extending from opposite side surfaces of the outer hub flange around and coaxially with the hub, annular spaces defined by surfaces of the cylindrical portions and an outer cylindrical surface of the hub;
  said cylindrical portions comprise first and second cylindrical portions provided respectively on first and second side surfaces of said outer hub flange in a region at the outer periphery of the spline coupling and extending axially between said outer hub flange and said main disc plate and between said outer hub flange and said auxiliary disc plate, respectively; and
  wherein the sliding friction means comprises annular friction members which are arranged in said annular spaces on both sides of said inner and outer hub flanges in the axial direction and fitted between the outer cylindrical surface of the hub and the inner surfaces of said first and second cylindrical portions to establish friction contact respectively.

13. In a clutch disc having a cylindrical hub connected to a torque output shaft, an inner hub flange formed as an integral part of the hub, an outer hub flange arranged coaxially around the outer circumference of the inner hub flange so as to rotate through a prescribed angle relative to the inner hub flange, both the inner and outer hub flanges being connected by spline coupling formed therebetween, main and auxiliary disc plates arranged to sandwich the inner and outer hub flanges in the axial direction thereof and connected to a torque input shaft, and sliding friction means provided so as to allow friction between the inner and outer hub flanges, wherein the improvement comprises:

the outer hub flange having cylindrical portions extending from opposite side surfaces of the outer hub flange around and coaxially with the hub, annular spaces defined by inner surfaces of the cylindrical portions and an outer cylindrical surface of the hub;

said cylindrical portions comprise first and second cylindrical portions provided respectively on first and second side surfaces of said outer hub flange in a region at the outer periphery of the spline coupling and extending axially between said outer hub flange and said main disc plate and between said outer hub flange and said auxiliary disc plate, respectively;

the sliding friction means comprises annular friction members which are arranged in said annular spaces on both sides of said inner and outer hub flanges in the axial direction and fitted between the outer cylindrical surface of the hub and the inner surfaces of said first and second cylindrical portions to establish friction contact, respectively and wherein said annular friction members form a sliding friction surface with an annular plate member which covers the spline coupling between said inner and outer hub flanges and rotates together with said inner hub flange.

* * * * *